United States Patent
Kotake et al.

(10) Patent No.: US 11,667,457 B2
(45) Date of Patent: Jun. 6, 2023

(54) PACKAGING BAG AND PACKAGED PRODUCT

(71) Applicant: Sumitomo Seika Chemicals Co., Ltd., Hyogo (JP)

(72) Inventors: Masato Kotake, Hyogo (JP); Katsuya Fujishiro, Hyogo (JP); Hiromichi Nishimori, Hyogo (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 518 days.

(21) Appl. No.: 15/557,218

(22) PCT Filed: Mar. 24, 2016

(86) PCT No.: PCT/JP2016/059449
§ 371 (c)(1),
(2) Date: Sep. 11, 2017

(87) PCT Pub. No.: WO2016/158689
PCT Pub. Date: Oct. 6, 2016

(65) Prior Publication Data
US 2018/0037391 A1 Feb. 8, 2018

(30) Foreign Application Priority Data

Mar. 30, 2015 (JP) .............................. JP2015-070322

(51) Int. Cl.
*B65D 81/26* (2006.01)
*B65D 33/01* (2006.01)
(Continued)

(52) U.S. Cl.
CPC ............ *B65D 81/264* (2013.01); *B01J 20/26* (2013.01); *B01J 20/28004* (2013.01);
(Continued)

(58) Field of Classification Search
CPC ...... B65D 81/264; B65D 65/38; B65D 33/01; B65D 88/74; B65D 77/04; B65D 88/22; B01J 20/28004; B01J 20/26
(Continued)

(56) References Cited

U.S. PATENT DOCUMENTS 3,085,608 A * 4/1963 Mathues .................. B26F 1/24
206/811
3,206,105 A * 9/1965 Smith ................ B65D 5/46008
383/10
(Continued)

FOREIGN PATENT DOCUMENTS

DE 202004019948 U1 2/2005
EP 0155035 A1 9/1985
(Continued)

OTHER PUBLICATIONS

International Preliminary Report on Patentability and English translation thereof dated Oct. 12, 2017.
(Continued)

*Primary Examiner* — J. Gregory Pickett
*Assistant Examiner* — Jenine Pagan
(74) *Attorney, Agent, or Firm* — Harness, Dickey & Pierce, P.L.C.

(57) ABSTRACT

A packaging bag for packaging water-absorbent resin powder includes a resin sheet with gas barrier properties which is formed in a bag shape having a charge opening for charging the water-absorbent resin powder into the packaging bag. At least one resin sheet piece of the resin sheet is provided with an incision penetrating the resin sheet piece in a thickness direction thereof, the incision having a dimension not larger than a predetermined length according to a mass median particle size of the water-absorbent resin powder.

4 Claims, 12 Drawing Sheets

(51) Int. Cl.
  *B01J 20/26* (2006.01)
  *B01J 20/28* (2006.01)
  *B65D 65/38* (2006.01)
  *B65D 77/04* (2006.01)
  *B65D 88/74* (2006.01)

(52) U.S. Cl.
  CPC ............. *B65D 33/01* (2013.01); *B65D 65/38* (2013.01); *B65D 77/04* (2013.01); *B65D 88/74* (2013.01)

(58) Field of Classification Search
  USPC ..... 206/204, 484, 484.1; 383/100, 101, 102, 383/103, 39, 109, 113
  See application file for complete search history.

(56) References Cited

U.S. PATENT DOCUMENTS

| | | | |
|---|---|---|---|
| 3,661,815 A | 5/1972 | Smith | |
| 4,076,663 A | 2/1978 | Masuda et al. | |
| 4,310,118 A * | 1/1982 | Kisida | B65D 33/01 383/102 |
| 4,446,261 A | 5/1984 | Yamasaki et al. | |
| 4,579,223 A * | 4/1986 | Otsuka | B65D 81/268 206/204 |
| 4,681,228 A * | 7/1987 | Kerry | B65B 9/20 383/111 |
| 4,974,725 A * | 12/1990 | Ishihara | A61L 9/05 206/0.5 |
| 5,286,407 A * | 2/1994 | Inoue | A23L 3/3436 206/204 |
| 5,613,779 A * | 3/1997 | Niwa | B65D 75/5805 383/201 |
| 6,126,975 A * | 10/2000 | Archibald | B65D 33/2533 426/106 |
| 6,883,964 B2 * | 4/2005 | Beaulieu | B65D 31/02 383/101 |
| 6,905,016 B2 * | 6/2005 | Kanios | A61F 15/001 206/204 |
| 6,986,605 B1 * | 1/2006 | Allen et al. | B65D 33/01 383/101 |
| 2003/0069359 A1 * | 4/2003 | Torii | A61F 13/531 525/178 |
| 2004/0019342 A1 * | 1/2004 | Nagasuna | A61F 13/15203 604/385.01 |
| 2006/0037884 A1 * | 2/2006 | Doyle et al. | B65D 81/20 206/524.8 |
| 2008/0144979 A1 * | 6/2008 | Capt | B65D 31/04 383/207 |
| 2008/0152266 A1 * | 6/2008 | Bergmann | B65D 33/01 383/103 |
| 2009/0035424 A1 * | 2/2009 | Mita | B32B 27/08 426/113 |
| 2011/0158562 A1 | 6/2011 | Desilets et al. | |
| 2011/0299798 A1 * | 12/2011 | Coulson | B65D 31/04 383/103 |
| 2013/0026412 A1 * | 1/2013 | Machida | C08F 6/008 252/194 |
| 2013/0310250 A1 | 11/2013 | Belack | |
| 2014/0376835 A1 * | 12/2014 | Rogers | B32B 27/065 383/105 |
| 2015/0274406 A1 * | 10/2015 | Balasubramanian | A23B 7/152 426/312 |
| 2015/0284249 A1 * | 10/2015 | Fujita | A01N 25/18 422/239 |
| 2016/0368631 A1 * | 12/2016 | Ikawa | B65D 81/2023 |

FOREIGN PATENT DOCUMENTS

| | | |
|---|---|---|
| EP | 0234202 A1 | 9/1987 |
| EP | 2186741 A1 | 5/2010 |
| EP | 3029077 A1 | 6/2016 |
| GB | 926198 A | 5/1963 |
| JP | S4943395 B1 | 11/1974 |
| JP | S51125468 A | 11/1976 |
| JP | S5214689 A | 2/1977 |
| JP | S55-161844 U | 11/1980 |
| JP | S5721405 A | 2/1982 |
| JP | S57158209 A | 9/1982 |
| JP | S62172006 A | 7/1987 |
| JP | H03-29779 A | 2/1991 |
| JP | H3197033 A | 8/1991 |
| JP | H6-345102 A | 12/1994 |
| JP | H10-181792 A | 7/1998 |
| JP | 2000/272635 A | 10/2000 |
| JP | 2002-522303 A | 7/2002 |
| JP | 2007-290724 A | 11/2007 |
| JP | 2011-025678 A | 2/2011 |
| JP | 2012/241000 A | 12/2012 |
| JP | 2015-016450 A | 1/2015 |
| JP | 2015-500351 A | 1/2015 |
| WO | WO-00/07895 A1 | 2/2000 |
| WO | WO-2015/016075 A1 | 2/2015 |

OTHER PUBLICATIONS

International Search Report PCT/ISA/210 for International Application No. PCT/JP2016/059449 dated Jun. 7, 2016.
Extended European Search Report dated Aug. 27, 2018.
Japanese Office Action dated Feb. 4, 2020 for corresponding Japanese Patent Application No. 2017-509875 and English concise explanation thereof.

* cited by examiner (a)

(b)

(a)

(b)

(c)

(d)

(a)

(b)

(c)

(d)

(e)

(g)

(h)

(a)

(b)

(a)

(b)

(c)

(a)

(b)

PACKAGING BAG AND PACKAGED PRODUCT

TECHNICAL FIELD

The present invention relates to a packaging bag for packaging water-absorbent resin powder and a packaged product in which water-absorbent resin powder is packaged with the packaging bag.

BACKGROUND ART

A water-absorbent resin has been widely used for hygiene products such as disposable diapers or sanitary products, products for daily use such as sheets for pets, industrial materials such as water-absorbent sheets for food, water-blocking materials for cables, or dew-catchers, water retention agents exclusive for greening/agriculture/gardening, soil conditioners, and the like. This water-absorbent resin is particularly used for hygiene products among the above-described uses.

Typically, such a water-absorbent resin is a lightly-cross-linked polymer. For example, a starch-based water-absorbent resin such as a starch-acrylonitrile graft copolymer hydrolysate (refer to Patent Literature 1) or a starch-acrylic acid graft copolymer neutralized product (refer to Patent Literature 2), a vinyl acetate-acrylic acid ester copolymer saponified product (refer to Patent Literature 3), and a partially neutralized product of polyacrylic acid (refer to Patent Literatures 4, 5, and 6) are known.

The water-absorbent resin is produced as a powder formed of water-absorbent resin particles by polymerizing a water-soluble ethylenically unsaturated monomer in a liquid medium to obtain a polymerization reaction solution and drying the polymerization reaction solution using a dryer.

In the related art, the powder (hereinafter, referred to as "water-absorbent resin powder") formed of water-absorbent resin particles is individually packaged in units of 10 kg to 200000 kg in a packaging container such as a container, a silo, a flexible container, or a paper bag which is a bag formed of paper (hereinafter, referred to as "paper bag"). In particular, from the viewpoint of better handleability during transportation or storage, a flexible container or a bag such as a paper bag is used in order to package water-absorbent resin powder.

However, a flexible container or a paper bag has gas permeability. Therefore, in a case where the water-absorbent resin powder is packaged with only a flexible container or a paper bag, gas such as moisture in the atmosphere permeates into the bag and is absorbed by the water-absorbent resin powder filled into the bag, which may impair the properties as a water-absorbent resin such as water absorption capacity or water retention capacity.

Therefore, in order to suppress the absorption of gas such as moisture in the atmosphere into the water-absorbent resin powder, the use of a packaging bag, which is formed in a bag shape using a resin sheet having gas barrier properties and is provided inside a flexible container or a bag such as a paper bag, is considered (refer to Patent Literatures 7 and 8).

CITATION LIST

Patent Literature

Patent Literature 1: Japanese Examined Patent Publication JP-B2 49-43395 (1974)

Patent Literature 2: Japanese Unexamined Patent Publication JP-A 51-125468 (1976)
Patent Literature 3: Japanese Unexamined Patent Publication JP-A 52-14689 (1977)
Patent Literature 4: Japanese Unexamined Patent Publication JP-A 62-172006 (1987)
Patent Literature 5: Japanese Unexamined Patent Publication JP-A 57-158209 (1982)
Patent Literature 6: Japanese Unexamined Patent Publication JP-A 57-21405 (1982)
Patent Literature 7: Japanese Unexamined Patent Publication JP-A 6-345102 (1994)
Patent Literature 8: Japanese Unexamined Patent Publication JP-A 3-197033 (1991)

SUMMARY OF INVENTION

Technical Problem

However, in a packaged product containing a package in which water-absorbent resin powder is packaged and sealed with the packaging bag, the packaging bag is formed of a resin sheet having gas barrier properties. Therefore, even in a case where an external force is applied to the packaged product and further to the package, air which is present in the packaging bag together with the water-absorbent resin powder is suppressed from being released from the inside of the packaging bag to the outside. Therefore, in the packaged product which is deformed by an external force, an elastic force is generated by the air present in the packaging bag.

In a case where an external force is applied to the packaged product by stacking a plurality of packaged products during transportation or storage, the stacked state of the packaged products becomes unstable due to an elastic force generated by the air present in the packaging bag, and thus load shifting may occur.

An object of the invention is to provide a packaging bag for packaging water-absorbent resin powder and a packaged product, in which deterioration of the properties as a water-absorbent resin can be suppressed and in which load shifting can be suppressed when a plurality of packaged products containing a package in which water-absorbent resin powder is packaged with the packaging bag are stacked.

Solution to Problem

According to one aspect of the invention, there is provided a packaging bag for packaging water-absorbent resin powder having a mass median particle size of 150 μm or more, the packaging bag including:
a resin sheet with gas barrier properties which is formed in a bag shape having an opening,
an incision having a length of 0.5 mm or less being provided in the resin sheet so as to penetrate the resin sheet in a thickness direction thereof.

According to one aspect of the invention, there is provided a packaging bag for packaging water-absorbent resin powder having a mass median particle size of less than 150 μm, the packaging bag including:
a resin sheet with gas barrier properties which is formed in a bag shape having an opening,
an incision having a length of 0.1 mm or less being provided in the resin sheet so as to penetrate the resin sheet in a thickness direction thereof.

In addition, in the packaging bag according to one aspect of the invention, it is preferable that the incision is provided at a position distant from an outer peripheral edge in a plan view of the packaging bag.

In addition, according to one aspect of the invention, there is provided a packaged product including:

a package composed of the above-described packaging bag and water-absorbent resin powder packaged with the packaging bag; and an outer bag formed of kraft paper with gas permeability and storing the package.

In addition, according to one aspect of the invention, there is provided packaged product including:

a package composed of the above-described packaging bag and water-absorbent resin powder packaged with the packaging bag; and an outer bag which is formed of a flexible container with gas permeability and storing the package.

Advantageous Effects of Invention

The packaging bag according to one aspect of the invention is a bag for packaging water-absorbent resin powder having a mass median particle size of 150 µm or more. This packaging bag includes a resin sheet having gas barrier properties which is formed in a bag shape having an opening. In the packaging bag, an incision having a length of 0.5 mm or less is provided in the resin sheet so as to penetrate the resin sheet in a thickness direction thereof.

In the resin sheet having gas barrier properties which constitutes the packaging bag according to one aspect of the invention, the incision having a length of 0.5 mm or less, which is predetermined according to a mass median particle size of 150 µm or more of the water-absorbent resin powder, is provided. Therefore, when the water-absorbent resin powder is packaged with the packaging bag, the leakage of the water-absorbent resin powder in the packaging bag from the incision is suppressed, the effect of suppressing the permeation of gas such as moisture in the atmosphere into the packaging bag is maintained, and air present in the packaging bag together with the water-absorbent resin powder can be released to the outside of the packaging bag through the incision. Accordingly, in the packaging bag according to one aspect of the invention, deterioration of the properties as a water-absorbent resin can be suppressed, and load shifting can be suppressed when a plurality of packaged products each containing a package in which the water-absorbent resin powder is packaged with the packaging bag are stacked.

In addition, the packaging bag according to one aspect of the invention is a bag for packaging water-absorbent resin powder having a mass median particle size of less than 150 µm. This packaging bag includes a resin sheet having gas barrier properties which is formed in a bag shape having an opening. In the packaging bag, an incision having a length of 0.1 mm or less is provided in the resin sheet so as to penetrate the resin sheet in a thickness direction thereof.

In the resin sheet having gas barrier properties which constitutes the packaging bag according to one aspect of the invention, the incision having a length of 0.1 mm or less, which is predetermined according to a mass median particle size of less than 150 µm of the water-absorbent resin powder, is provided. Therefore, when the water-absorbent resin powder is packaged with the packaging bag, the leakage of the water-absorbent resin powder in the packaging bag from the incision is suppressed, the effect of suppressing the permeation of gas such as moisture in the atmosphere into the packaging bag is maintained, and air present in the packaging bag together with the water-absorbent resin powder can be released to the outside of the packaging bag through the incision. Accordingly, in the packaging bag according to one aspect of the invention, deterioration of the properties as a water-absorbent resin can be suppressed, and load shifting can be suppressed when a plurality of packaged products each containing a package in which the water-absorbent resin powder is packaged with the packaging bag are stacked.

In addition, in the resin sheet which constitutes the packaging bag according to one aspect of the invention, the incision is provided at a position distant from an outer peripheral edge in a plan view of the packaging bag. In a case where an external force is applied to a packaged product by stacking a plurality of packaged products each containing a package in which the water-absorbent resin powder is packaged with the packaging bag, a force for releasing air present in the packaging bag to the outside is the maximum at an outer peripheral edge in a plan view of the packaging bag at the moment of deformation of the packaging bag according to the release of air. As the incision is provided at a position distant from an outer peripheral edge in a plan view of the packaging bag in this way, the leakage of the water-absorbent resin powder along with the flow of air released from the incision to the outside of the packaging bag can be suppressed.

In addition, the packaged product according to one aspect of the invention includes: a package composed of the above-described packaging bag and water-absorbent resin powder which is packaged with the packaging bag; and an outer bag which is formed of kraft paper having gas permeability and stores the package. In the above-described packaged product, the water-absorbent resin powder is packaged with the packaging bag according to the invention. Therefore, load shifting is suppressed when a plurality of packaged products are stacked.

In addition, the packaged product according to one aspect of the invention includes: a package composed of the above-described packaging bag and water-absorbent resin powder which is packaged with the packaging bag; and an outer bag which is formed of a flexible container having gas permeability and stores the package. In the above-described packaged product, the water-absorbent resin powder is packaged with the packaging bag according to the invention. Therefore, load shifting is suppressed when a plurality of packaged products are stacked.

BRIEF DESCRIPTION OF DRAWINGS

Other and further objects, features, and advantages of the invention will be more explicit from the following detailed description taken with reference to the drawings wherein.

DESCRIPTION OF EMBODIMENTS

Hereinafter, preferred embodiments of the invention will be described in detail with reference to the drawings.

Figure 1A:
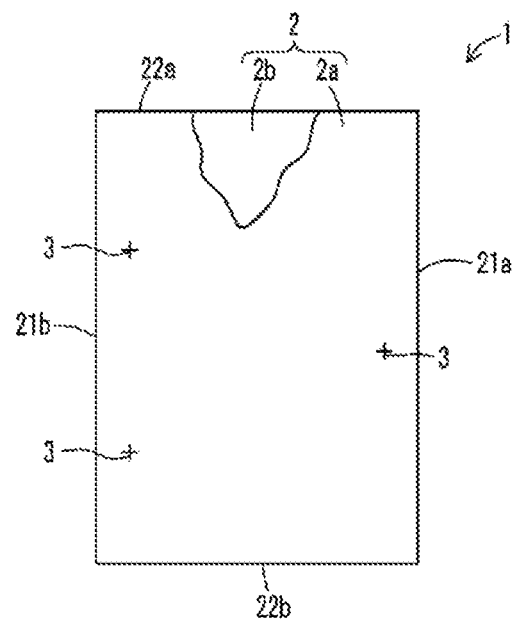
FIG. 1A is a schematic diagram showing a configuration of a packaging bag 1 according to an embodiment of the invention.
Figure 1A:
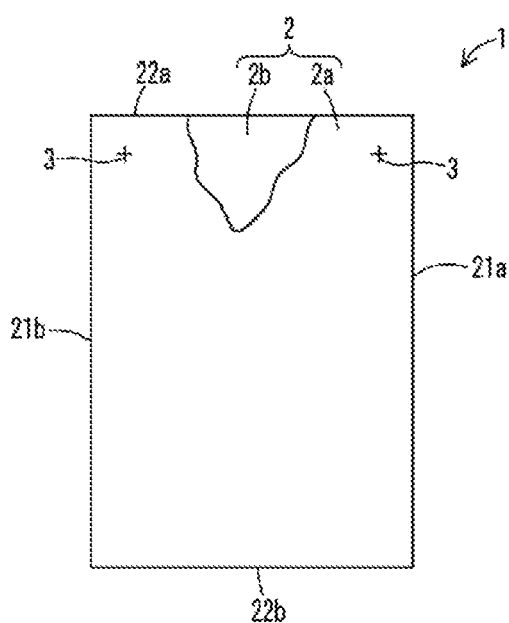
Figure 1B:
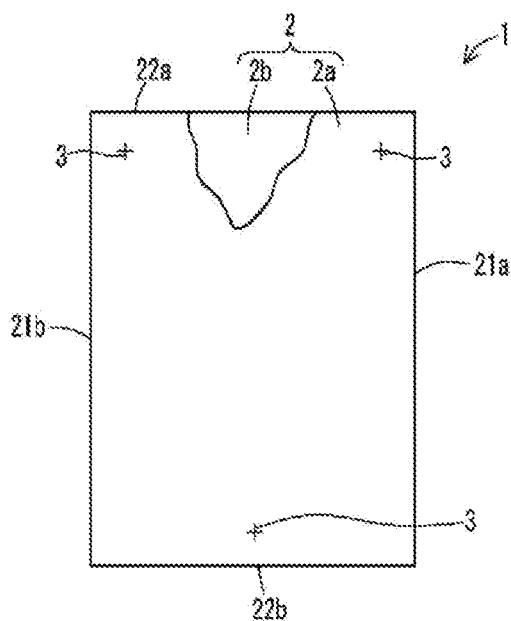
FIG. 1B is a schematic diagram showing a configuration of the packaging bag 1 according to an embodiment of the invention.
Figure 1B:
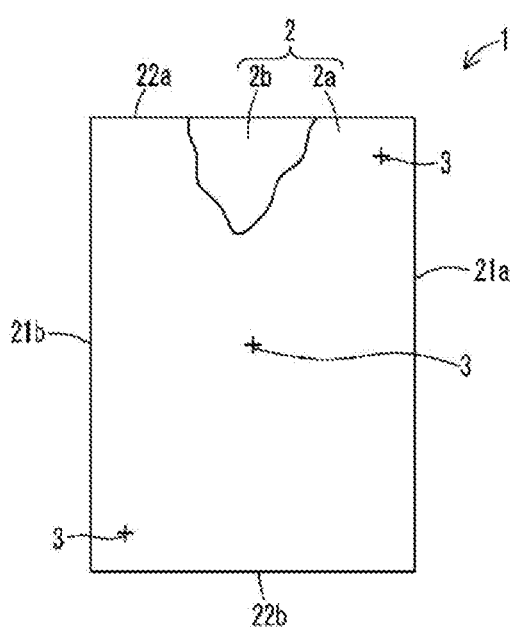

FIGS. 1A and 1B are schematic diagrams showing configurations of a packaging bag 1 according to an embodiment of the invention. The packaging bag 1 is a bag for packaging water-absorbent resin powder having a mass median particle size of 150 μm or more. The upper limit value of the mass median particle size of the water-absorbent resin powder is not particularly limited and is, for example, 1000 μm or less, or 550 μm or less.

Here, the water-absorbent resin powder is a powder formed of water-absorbent resin particles. The water-absorbent resin can be produced by polymerizing a water-soluble ethylenically unsaturated monomer. A method of polymerizing the water-soluble ethylenically unsaturated monomer is not particularly limited, and a representative polymerization method such as an aqueous polymerization method, an emulsion polymerization method, or a reversed phase suspension polymerization method can be used.

In the aqueous polymerization method, polymerization is performed by heating an aqueous solution of the water-soluble ethylenically unsaturated monomer, an internal crosslinking agent, and a water-soluble radical polymerization initiator while stirring them as necessary. In the aqueous polymerization method, water is used as a liquid medium, and the polymerization reaction is performed in a state where the water-soluble ethylenically unsaturated monomer is in the form of an aqueous solution.

In addition, in the reversed phase suspension polymerization method, for example, polymerization is performed by heating an aqueous solution of the water-soluble ethylenically unsaturated monomer, a surfactant, a hydrophobic polymeric dispersant, a water-soluble radical polymerization initiator, and an internal crosslinking agent in a petroleum hydrocarbon aqueous dispersion medium while stirring them. In the reversed phase suspension polymerization method, water and the petroleum hydrocarbon aqueous dispersion medium are used as liquid media, and the polymerization reaction is performed by adding the aqueous solution of the water-soluble ethylenically unsaturated monomer into the petroleum hydrocarbon aqueous dispersion medium.

The water-absorbent resin powder is obtained by polymerizing a water-soluble ethylenically unsaturated monomer in a liquid medium to obtain a polymerization reaction solution and drying the polymerization reaction solution using a dryer.

In addition, in the invention, the mass median particle size of the water-absorbent resin powder refers to a particle size corresponding to a sieve opening when an integrated mass reaches 50 mass % with respect to the total mass of all the particles, the integrated mass being obtained by sequentially integrating the masses of the particles remaining on respective sieves when the water-absorbent resin powder is classified using the sieves. More specifically, about 50 g of the water-absorbent resin powder is caused to pass through a JIS standard sieve having an opening of 250 μm. In a case where 50 mass % or higher of the water-absorbent resin powder with respect to the total mass passes through the sieve having an opening of 250 μm, the mass median particle size is measured using a plurality of JIS standard sieves which are combined as shown in the following "Combination A". In a case where 50 mass % or higher of the water-absorbent resin powder with respect to the total mass remains on the sieve having an opening of 250 μm, the mass median particle size is measured using a plurality of JIS standard sieves which are combined as shown in the following "Combination B".

<Combination A>

JIS standard sieves including a sieve having an opening of 500 μm, a sieve having an opening of 250 μm, a sieve having an opening of 180 μm, a sieve having an opening of 150 μm, a sieve having an opening of 106 μm, a sieve having an opening of 75 μm, and a sieve having an opening of 45 μm, and a receiver are combined in this order from above.

<Combination B>

JIS standard sieves including a sieve having an opening of 850 μm, a sieve having an opening of 600 μm, a sieve having an opening of 500 μm, a sieve having an opening of 425 μm, a sieve having an opening of 250 μm, a sieve having an opening of 150 μm, and a sieve having an opening of 75 μm, and a receiver are combined in this order from above.

About 50 g of the water-absorbent resin powder is put into the uppermost sieve of the combination and is classified by shaking the sieves using a RO-TAP shaker for 20 minutes. After the classification, the masses of water-absorbent resin powders remaining on the respective sieves are calculated as the mass percentages with respect to the total mass of the water-absorbent resin powder before the classification and are integrated in order from the largest particle size to the smallest particle size. Next, a relationship between the opening sizes of the sieves and the integrated value of the mass percentages of the water-absorbent resin powders remaining on the sieves is plotted on a logarithmic probability paper. By connecting the plots on the logarithmic probability paper with a straight line, a particle size corresponding to 50 mass % with respect to the integrated mass percentage can be obtained as the mass median particle size. In "Combination A", in a case where 50% or higher of the water-absorbent resin powder passes through the sieve having an opening of 45 μm, the mass median particle size is measured using a Coulter-counter method.

In the packaging bag 1 according to the embodiment, a resin sheet 2 having gas barrier properties is formed in a bag shape having a charge opening for charging the water-absorbent resin powder into the packaging bag 1. A method of forming the packaging bag 1 is not particularly limited, and examples thereof include a method of using the resin sheet 2 having a bottomed cylindrical shape, a method of welding one opening edge of the resin sheet 2 having a cylindrical shape by heat sealing or the like, a method of adhering one opening edge of the resin sheet 2 having a cylindrical shape with a resin sheet for adhesion, a method of binding one opening edge of the resin sheet 2 having a cylindrical shape with a stopper, and a method of causing a plurality (for example, two) of resin sheets 2 to overlap each other and welding outer peripheral edges thereof. The packaging bag 1 which is formed in a bag shape using the resin sheet 2 has a structure in which a pair of resin sheet pieces 2a and 2b is disposed to face each other in a plan view. In the packaging bag 1, an incision 3 having a length of 0.5 mm or less is provided in the resin sheet 2 so as to penetrate the resin sheet 2 in a thickness direction thereof. More specifically, in the packaging bag 1, the incision 3 is provided in at least one of the pair of resin sheet pieces 2a and 2b in a plan view.

FIGS. 1A and 1B are plan views showing the packaging bag 1 in which a part of the resin sheet piece 2a is cut out incision for easy understanding of the configuration of the packaging bag 1.

A material for forming the resin sheet 2 is not particularly limited as long as it is a synthetic resin having gas barrier properties, and examples thereof include polyethylene (PE), polypropylene (PP), polyethylene terephthalate (PET), and polyvinyl chloride (PVC). In addition, for example, an aluminum laminated material or an aluminum deposited material including the above-described resin as a substrate can also be used.

In the embodiment, the pair of resin sheet pieces 2a and 2b is formed in a rectangular plate shape in which long-side outer peripheral edges 21a and long-side outer peripheral edges 21b corresponding to long sides which face each other are respectively welded to each other, short-side outer peripheral edges 22b corresponding to one short sides among short sides which face each other are welded to each other, and the remaining short-side outer peripheral edges 22a are open without being welded to each other. In the packaging bag 1, the short-side outer peripheral edge 22a which is open forms the charge opening for charging the water-absorbent resin powder into the packaging bag 1.

The thickness of the resin sheet 2, in other words, the thickness of each of the resin sheet pieces 2a and 2b constituting the resin sheet 2 is, for example, 10 to 300 µm.

In addition, the size of each of the resin sheet pieces 2a and 2b constituting the resin sheet 2 is appropriately set based on the amount of the water-absorbent resin powder filled into the packaging bag 1. For example, in a case where the packaging bag 1 is used for a packaged product 100 including an outer bag 102 which is formed of kraft paper described below, when the amount of the water-absorbent resin powder filled into the packaging bag 1 is 10 to 30 kg, the length of a long side is 700 to 1000 mm, and the length of a short side is 300 to 600 mm.

In addition, in a case where the packaging bag 1 is used for a packaged product 200 including an outer bag 202 which is formed of a flexible container described below, when the amount of the water-absorbent resin powder filled into the packaging bag 1 is 300 to 1500 kg, the length of a long side is 2800 to 4000 mm, and the length of a short side is 1500 to 2300 mm.

The incision 3, which is provided in at least one of the resin sheet pieces 2a and 2b of the resin sheet 2 so as to penetrate at least one of the resin sheet pieces 2a and 2b in the thickness direction, is a cut mark which is formed by pressing a blade having a cutting edge (for example, a cutter knife), a blade having a tapered needle-shaped tip (for example, an injection needle), or a blade having a cross-shaped tip against at least one of the resin sheet pieces 2a and 2b and cutting at least one of the resin sheet pieces 2a and 2b. The shape of the incision 3 is not particularly limited, and examples thereof include a shape expressed by one line segment, a shape expressed by a combination of a plurality of line segments, and a shape expressed by a curve such as a circular shape or an elliptical shape. The length of the incision 3 is the longest length of the cut mark. For example, the length of the incision 3 having a shape expressed by one line segment is the length of the line segment, the length of the incision 3 having a shape expressed by a combination of a plurality of line segments is the length of the longest line segment, and the length of the incision 3 having a shape expressed by a curve such as a circular shape or an elliptical shape which is formed using a blade having a tapered needle-shaped tip is the length of the major axis.

In the embodiment, the incision 3 is provided at the same positions of the resin sheet pieces 2a and 2b of the resin sheet 2.

In the resin sheet 2 having gas barrier properties which constitutes the packaging bag 1 according to the embodiment, the incision 3 having a length of 0.5 mm or less, which is predetermined according to a mass median particle size of 150 µm or more of the water-absorbent resin powder, is provided. Therefore, when the water-absorbent resin powder is packaged with the packaging bag 1, the leakage of the water-absorbent resin powder in the packaging bag 1 from the incision 3 is suppressed, the effect of suppressing the permeation of gas such as moisture in the atmosphere into the packaging bag 1 is maintained, and air present in the packaging bag 1 together with the water-absorbent resin powder can be released to the outside of the packaging bag 1 through the incision 3. Accordingly, in the packaging bag 1, deterioration of the properties as a water-absorbent resin can be suppressed, and load shifting can be suppressed when a plurality of packaged products each containing a package in which the water-absorbent resin powder is packaged with the packaging bag 1 are stacked.

The reason why the leakage of the water-absorbent resin powder in the packaging bag 1 from the incision 3 is suppressed is presumed to be that the water-absorbent resin powder in the vicinity of the incision 3 forms an arch structure, and clogging which obstructs the leakage of the water-absorbent resin powder from the incision 3 occurs. The likelihood of the clogging can be expressed by an index of flowability of a powder described in "Journal of Chemical Engineering of Japan" (edited by The Society of Chemical Engineers, Japan, fifth revised edition, p. 254-255). According to "Journal of Chemical Engineering of Japan", the index of flowability of the water-absorbent resin powder is calculated based on angle of repose, compressibility, angle of spatula, cohesion, and uniformity.

In addition, the number of incisions 3 in the resin sheet 2 is not particularly limited. For example, in a case where the packaging bag 1 is used for the packaged product 100 including the outer bag 102 which is formed of kraft paper described below, the number of incisions 3 per unit area of an outer shape in a plan view of the packaging bag 1 is preferably 0.000001 to 0.0001 pieces/mm$^2$, and more preferably 0.000003 to 0.00005 pieces/mm$^2$. For example, in a case where the packaging bag 1 is used for the packaged product 200 including the outer bag 202 which is formed of a flexible container described below, the number of incisions 3 per unit area of the outer shape in a plan view of the packaging bag 1 is preferably 0.0000001 to 0.000005 pieces/mm$^2$, and more preferably 0.0000002 to 0.000003 pieces/mm$^2$. In a case where the number of incisions 3 per unit area is less than the lower limit value, when the water-absorbent resin powder is packaged with the packaging bag 1, the effect of releasing air, which is present in the packaging bag 1 together with the water-absorbent resin powder, from the incision 3 may deteriorate. In addition, in a case where the number of incisions 3 per unit area is more than the upper limit value, when the water-absorbent resin powder is packaged with the packaging bag 1, the effect of suppressing the permeation of gas such as moisture in the atmosphere into the packaging bag 1 may deteriorate.

In addition, it is preferable that the incision 3 is provided at a position distant from an outer peripheral edge in a plan view of the packaging bag 1. More specifically, it is more preferable that the incision 3 is provided at positions distant from outer peripheral edges of the pair of resin sheet pieces 2a and 2b in a plan view of the packaging bag 1. That is, the incision 3 is provided at inner regions at a predetermined distance from the outer peripheral edges of the pair of resin sheet pieces 2a and 2b.

In the packaging bag 1 of the example shown in FIG. 1A(a), one incision 3 is provided along the long-side outer peripheral edges 21a of the pair of resin sheet pieces 2a and 2b, and two incisions 3 are provided along the long-side outer peripheral edges 21b of the pair of resin sheet pieces 2a and 2b.

In the packaging bag 1 of the example shown in FIG. 1A(b), two incisions 3 are provided along the short-side outer peripheral edges 22a of the pair of resin sheet pieces 2a and 2b.

In the packaging bag 1 of the example shown in FIG. 1B(c), two incisions 3 are provided along the short-side outer peripheral edges 22a of the pair of resin sheet pieces 2a and 2b, and one incision 3 is provided along the short-side outer peripheral edges 22b of the pair of resin sheet pieces 2a and 2b.

In the packaging bag 1 of the example shown in FIG. 1B(d), three incisions 3 are provided along one diagonal lines of the pair of resin sheet pieces 2a and 2b.

In a case where an external force is applied to a packaged product by stacking a plurality of packaged products each containing a package in which the water-absorbent resin powder is packaged with the packaging bag 1, a force for releasing air present in the packaging bag 1 to the outside is the maximum at an outer peripheral edge in a plan view of the packaging bag 1 at the moment of deformation of the packaging bag 1 according to the release of air. As described above, the incision 3 is provided at a position distant from an outer peripheral edge in a plan view of the packaging bag 1, that is, at inner regions at a predetermined distance from the outer peripheral edges of the pair of resin sheet pieces 2a and 2b. As a result, the leakage of the water-absorbent resin powder along with the flow of air released from the incision 3 to the outside of the packaging bag 1 can be suppressed.

Figure 2A:
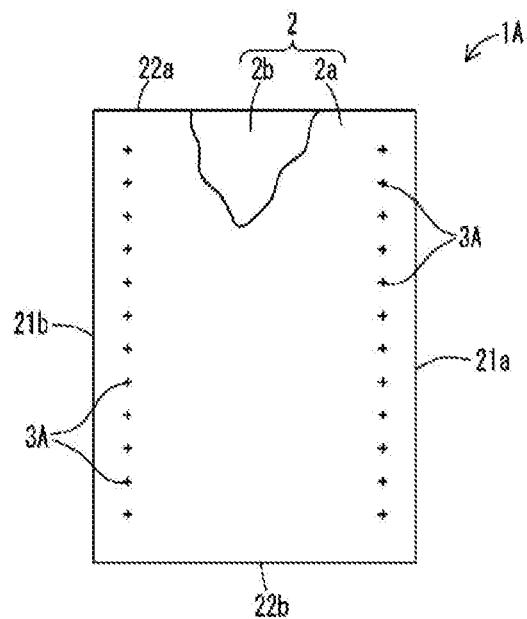
FIG. 2A is a schematic diagram showing a configuration of a packaging bag 1A according to an embodiment of the invention.
Figure 2A:
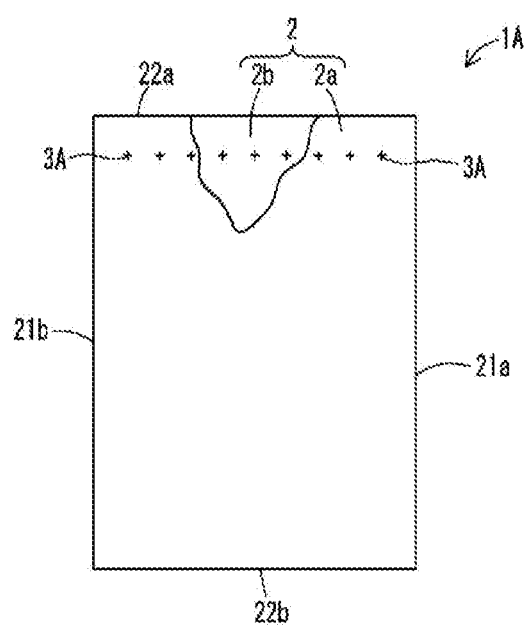
Figure 2B:
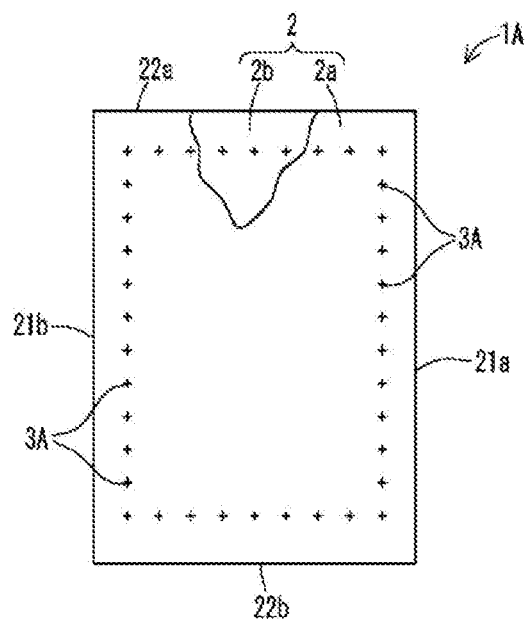
FIG. 2B is a schematic diagram showing a configuration of the packaging bag 1A according to an embodiment of the invention.
Figure 2B:
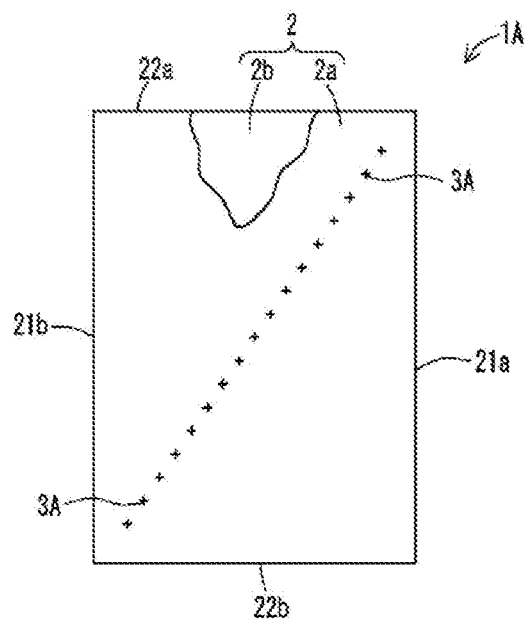

FIGS. 2A and 2B are schematic diagrams showing configurations of a packaging bag 1A according to an embodiment of the invention. The packaging bag 1A according to the embodiment is similar to the packaging bag 1. Therefore, corresponding components are denoted by the same reference numerals, and the description thereof will be omitted. The packaging bag 1A has the same configuration as the packaging bag 1, except that a configuration of the incision 3A is different from that of the incision 3.

The packaging bag 1A is a bag for packaging water-absorbent resin powder having a mass median particle size of less than 150 μm. The lower limit value of the mass median particle size of the water-absorbent resin powder is not particularly limited and is, for example, 10 μm or more.

In the packaging bag 1A according to the embodiment, a resin sheet 2 having gas barrier properties is formed in a bag shape having a charge opening for charging the water-absorbent resin powder into the packaging bag 1A. A method of forming the packaging bag 1A is not particularly limited, and examples thereof are the same as those of the packaging bag 1. The packaging bag 1A which is formed in a bag shape using the resin sheet 2 has a structure in which a pair of resin sheet pieces 2a and 2b are disposed to face each other in a plan view. In the packaging bag 1A, the incision 3A having a length of 0.1 mm or less is provided in the resin sheet 2 so as to penetrate the resin sheet 2 in the thickness direction. More specifically, in the packaging bag 1A, the incision 3A is provided in at least one of the pair of resin sheet pieces 2a and 2b in a plan view.

FIGS. 2A and 2B are plan views showing the packaging bag 1A in which a part of the resin sheet piece 2a is cut out incision for easy understanding of the configuration of the packaging bag 1A.

In the embodiment, the pair of resin sheet pieces 2a and 2b are formed in a rectangular plate shape in which long-side outer peripheral edges 21a and long-side outer peripheral edges 21b corresponding to long sides which face each other are respectively welded to each other, short-side outer peripheral edges 22b corresponding to one short sides among short sides which face each other are welded to each other, and the remaining short-side outer peripheral edges 22a are open without being welded to each other. In the packaging bag 1A, the short-side outer peripheral edge 22a which is open forms the charge opening for charging the water-absorbent resin powder into the packaging bag 1A.

In this embodiment, the thickness of the resin sheet 2, in other words, the thickness of each of the resin sheet pieces 2a and 2b constituting the resin sheet 2 is, for example, 10 to 300 μm.

In addition, in the embodiment, the size of each of the resin sheet pieces 2a and 2b constituting the resin sheet 2 is appropriately set based on the amount of the water-absorbent resin powder filled into the packaging bag 1A. For example, in a case where the packaging bag 1A is used for the packaged product 100 including the outer bag 102 which is formed of kraft paper described below, when the amount of the water-absorbent resin powder filled into the packaging bag 1A is 10 to 30 kg, the length of a long side is 700 to 1000 mm, and the length of a short side is 300 to 600 mm.

In addition, in a case where the packaging bag 1A is used for the packaged product 200 including the outer bag 202 which is formed of a flexible container described below, when the amount of the water-absorbent resin powder filled into the packaging bag 1A is 300 to 1500 kg, the length of a long side is 2800 to 4000 mm, and the length of a short side is 1500 to 2300 mm.

The incision 3A, which is provided in at least one of the resin sheet pieces 2a and 2b of the resin sheet 2 so as to penetrate at least one of the resin sheet pieces 2a and 2b in the thickness direction, is a cut mark which is formed by pressing a blade having a cutting edge (for example, a cutter knife), a blade having a tapered needle-shaped tip (for example, an injection needle), or a blade having a cross-shaped tip against at least one of the resin sheet pieces 2a and 2b and cutting at least one of the resin sheet pieces 2a and 2b. The shape of the incision 3A is not particularly limited, and examples thereof include a shape expressed by one line segment, a shape expressed by a combination of a plurality of line segments, and a shape expressed by a curve such as a circular shape or an elliptical shape. The length of the incision 3A is the longest length of the cut mark. For example, the length of the incision 3A having a shape expressed by one line segment is the length of the line segment, the length of the incision 3A having a shape expressed by a combination of a plurality of line segments is the length of the longest line segment, and the length of the incision 3A having a shape expressed by a curve such as a circular shape or an elliptical shape which is formed using a blade having a tapered needle-shaped tip is the length of the major axis.

In the embodiment, the incision 3A is provided at the same positions of the resin sheet pieces 2a and 2b of the resin sheet 2.

In the resin sheet 2 having gas barrier properties which constitutes the packaging bag 1A according to the embodiment, the incision 3A having a length of 0.1 mm or less, which is predetermined according to a mass median particle size of less than 150 μm of the water-absorbent resin powder, is provided. Therefore, when the water-absorbent resin powder is packaged with the packaging bag 1A, the leakage of the water-absorbent resin powder in the packaging bag 1A from the incision 3A is suppressed, the effect of suppressing the permeation of gas such as moisture in the atmosphere into the packaging bag 1A is maintained, and air present in the packaging bag 1A together with the water-absorbent resin powder can be released to the outside of the packaging bag 1A through the incision 3A. Accordingly, in the packaging bag 1A, deterioration of the properties as a water-absorbent resin can be suppressed, and load shifting can be suppressed when a plurality of packaged products each containing a package in which the water-absorbent resin powder is packaged with the packaging bag 1A are stacked.

In addition, the number of incisions 3A in the resin sheet 2 is not particularly limited. For example, in a case where the packaging bag 1A is used for the packaged product 100 including the outer bag 102 which is formed of kraft paper described below, the number of incisions 3A per unit area of an outer shape in a plan view of the packaging bag 1A is preferably 0.000001 to 0.03 pieces/mm$^2$ and more preferably 0.00001 to 0.01 pieces/mm$^2$. For example, in a case where the packaging bag 1A is used for the packaged product 200 including the outer bag 202 which is formed of a flexible container described below, the number of incisions 3A per unit area of the outer shape in a plan view of the packaging bag 1A is preferably 0.0000001 to 0.03 pieces/mm$^2$ and more preferably 0.000001 to 0.01 pieces/mm$^2$. In a case where the number of incisions 3A per unit area is less than the lower limit value, when the water-absorbent resin powder is packaged with the packaging bag 1A, the effect of releasing air, which is present in the packaging bag 1A together with the water-absorbent resin powder, from the incision 3A may deteriorate. In addition, in a case where the number of incisions 3A per unit area is more than the upper limit value, when the water-absorbent resin powder is packaged with the packaging bag 1A, the effect of suppressing the permeation of gas such as moisture in the atmosphere into the packaging bag 1A may deteriorate.

In addition, it is preferable that the incision 3A is provided at a position distant from an outer peripheral edge in a plan view of the packaging bag 1A. More specifically, it is more preferable that the incision 3A is provided at positions distant from outer peripheral edges of the pair of resin sheet pieces 2a and 2b in a plan view of the packaging bag 1A. That is, the incision 3A is provided at inner regions at a predetermined distance from the outer peripheral edges of the pair of resin sheet pieces 2a and 2b.

In the packaging bag 1A of the example shown in FIG. 2A(a), a plurality of incisions 3A are provided along the long-side outer peripheral edges 21a of the pair of resin sheet pieces 2a and 2b, and a plurality of incisions 3A are provided along the long-side outer peripheral edges 21b of the pair of resin sheet pieces 2a and 2b.

In the packaging bag 1A of the example shown in FIG. 2A(b), a plurality of incisions 3A are provided along the short-side outer peripheral edges 22a of the pair of resin sheet pieces 2a and 2b.

In the packaging bag 1A of the example shown in FIG. 2B(c), a plurality of incisions 3A are provided along the short-side outer peripheral edges 22a of the pair of resin sheet pieces 2a and 2b, a plurality of incisions 3A are provided along the short-side outer peripheral edges 22b of the pair of resin sheet pieces 2a and 2b, a plurality of incisions 3A are provided along the long-side outer peripheral edges 21a of the pair of resin sheet pieces 2a and 2b, and a plurality of incisions 3A are provided along the long-side outer peripheral edges 21b of the pair of resin sheet pieces 2a and 2b.

In the packaging bag 1A of the example shown in FIG. 2B(d), a plurality of incisions 3A are provided along one diagonal lines of the pair of resin sheet pieces 2a and 2b.

In a case where an external force is applied to a packaged product by stacking a plurality of packaged products each containing a package in which the water-absorbent resin powder is packaged with the packaging bag 1A, a force for releasing air present in the packaging bag 1A to the outside is the maximum at an outer peripheral edge in a plan view of the packaging bag 1A at the moment of deformation of the packaging bag 1A according to the release of air. As described above, the incision 3A is provided at a position distant from an outer peripheral edge in a plan view of the packaging bag 1A, that is, at inner regions at a predetermined distance from the outer peripheral edges of the pair of resin sheet pieces 2a and 2b. As a result, the leakage of the water-absorbent resin powder along with the flow of air released from the incision 3A to the outside of the packaging bag 1A can be suppressed.

FIGS. 3A to 3D are schematic diagrams showing modified examples of the packaging bag 1 and the packaging bag 1A. The packaging bag 1 or 1A shown in FIGS. 3A to 3D is preferable as a packaging bag used for the packaged product 200 including the outer bag 202 which is formed of a flexible container described below.

Figure 3A:
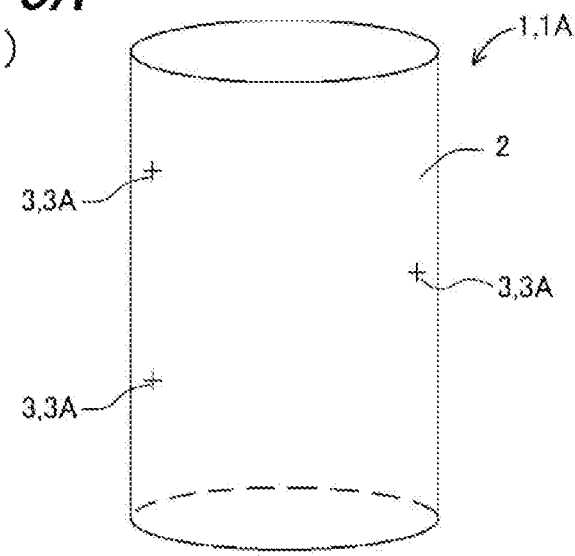
FIG. 3A is a schematic diagram showing a modified example of the packaging bag 1 and the packaging bag 1A.
Figure 3A:
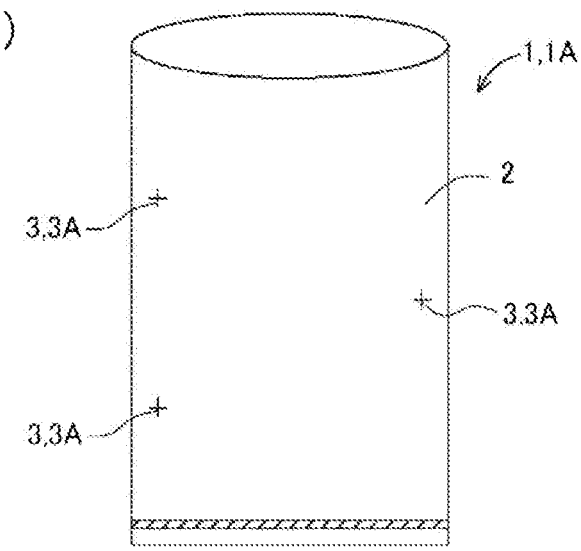

In the modified example shown in FIG. 3A(a), the packaging bag 1 or 1A is formed in a bag shape using the resin sheet 2 having a bottomed cylindrical shape. In the modified example shown in FIG. 3A(b), the packaging bag 1 or 1A is formed in a bag shape by welding one opening edge of the resin sheet 2 having a cylindrical shape by heat sealing or the like.

Figure 3B:
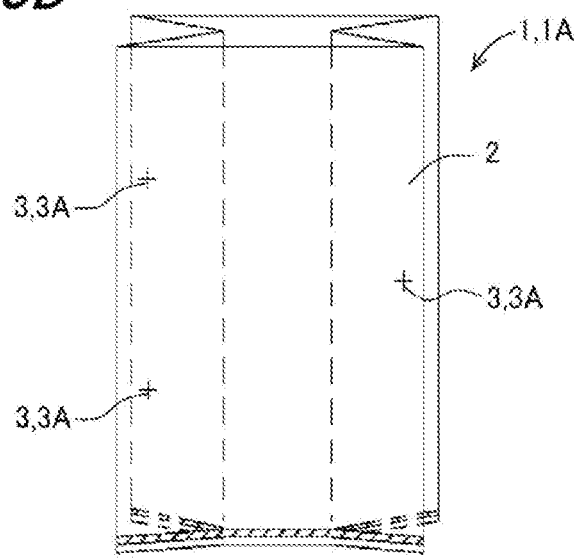
FIG. 3B is a schematic diagram showing a modified example of the packaging bag 1 and the packaging bag 1A.
Figure 3B:
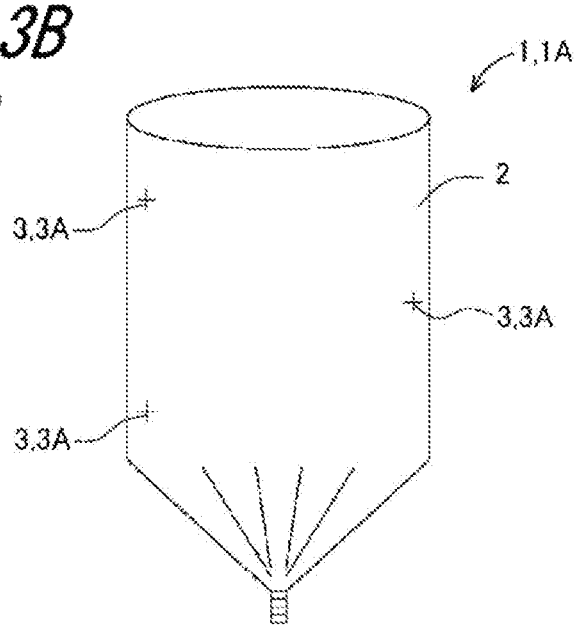

In the modified example shown in FIG. 3B(c), the packaging bag 1 or 1A is formed in a bag shape by welding one opening edge of the resin sheet 2 having a quadrangle tubular shape by heat sealing or the like. In the modified example shown in FIG. 3B(d), the packaging bag 1 or 1A is formed in a bag shape by binding one opening edge of the resin sheet 2 having a cylindrical shape with a stopper.

Figure 3C:
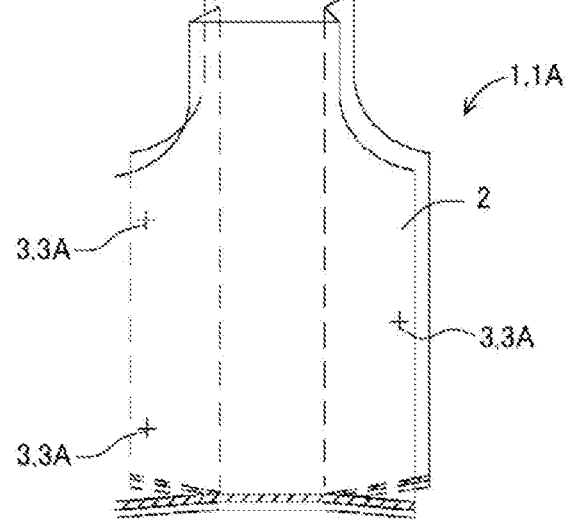
FIG. 3C is a schematic diagram showing a modified example of the packaging bag 1 and the packaging bag 1A.

In the modified example shown in FIG. 3C(e), the packaging bag 1 or 1A is formed in a bag shape by welding one opening edge of the resin sheet 2 having a quadrangle tubular shape with a tapered tip by heat sealing or the like. In the modified example shown in FIG. 3D(d), the packaging bag 1 or 1A is formed in a bag shape by welding one opening edge (lower opening edge) of the resin sheet 2 having a quadrangle tubular shape with opposite tapered tips by heat sealing or the like. The other opening edge (upper opening edge) may be bound with a stopper or the like.

Figure 3D:
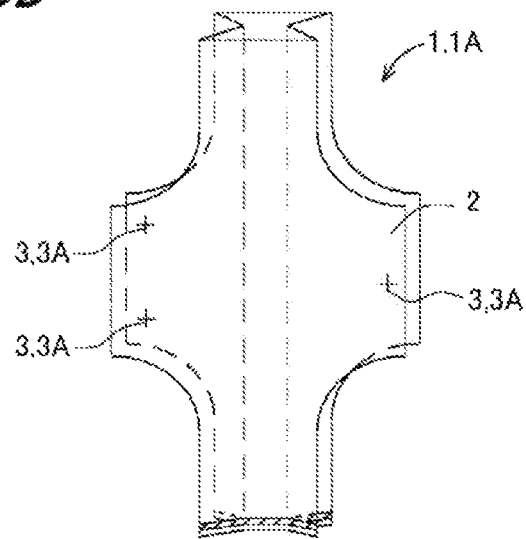
FIG. 3D is a schematic diagram showing a modified example of the packaging bag 1 and the packaging bag 1A.
Figure 3D:
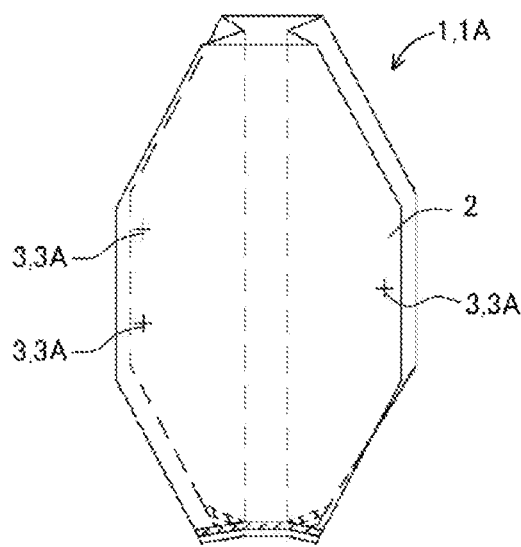

In the modified example shown in FIG. 3D(h), the packaging bag 1 or 1A is formed in a bag shape by welding one opening edge of the resin sheet 2 having a quadrangle tubular shape by heat sealing or the like. In each of the modified examples shown in FIG. 3C(e), FIG. 3D(g), and FIG. 3D(h), one opening edge (lower opening edge) may be bound with a stopper or the like instead of being welded by heat sealing or the like.

Figure 4:
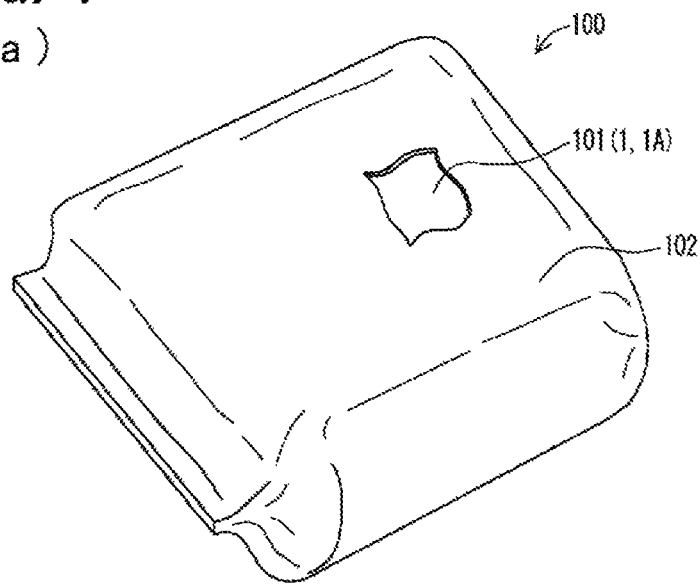
FIG. 4 is a schematic diagram showing a configuration of a packaged product 100 according to an embodiment of the invention.
Figure 4:
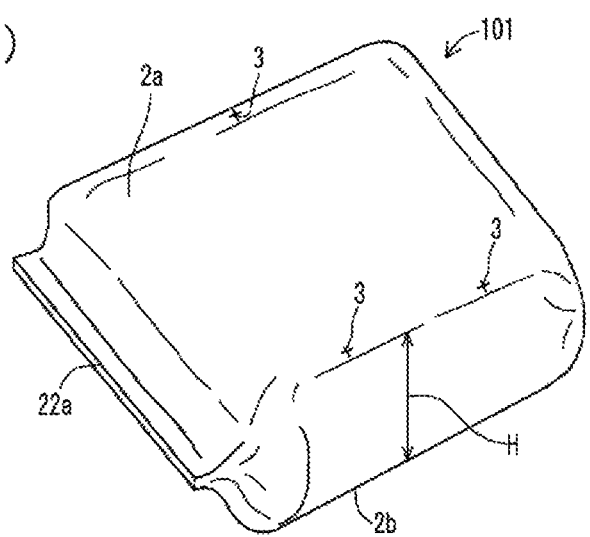
Figure 5:
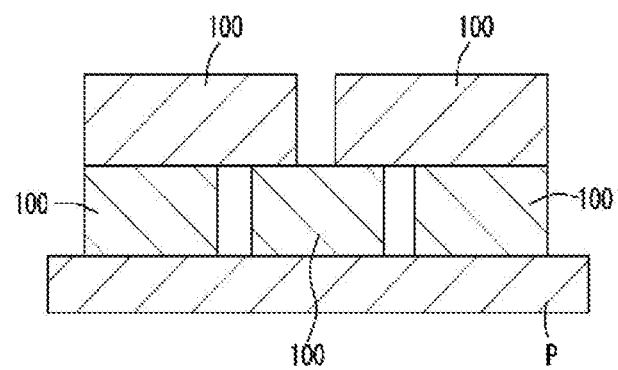
FIG. 5 is a diagram showing states where the packaged products 100 are stacked on a pallet P.
Figure 5:
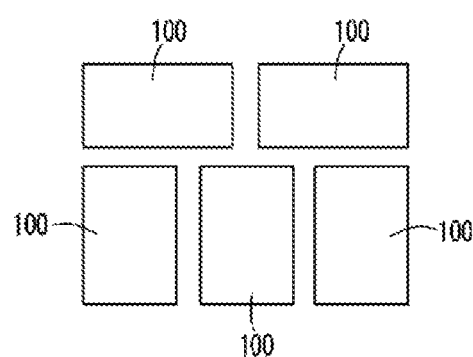
Figure 5:
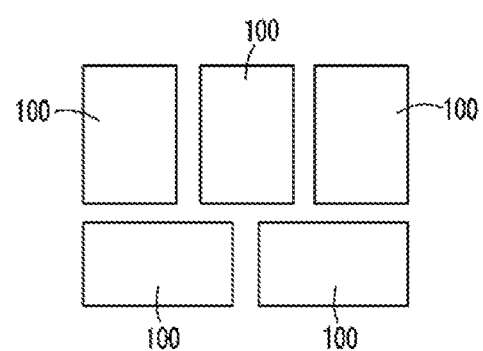

FIG. 4 is a schematic diagram showing a configuration of the packaged product 100 according to an embodiment of the invention. FIG. 5 is a diagram showing states where the packaged product 100 is stacked on a pallet P.

The packaged product 100 according to the embodiment includes: a package 101 composed of the packaging bag 1 or 1A and water-absorbent resin powder which is packaged and sealed with the packaging bag 1 or 1A; and the outer bag 102 that is formed of kraft paper having gas permeability and stores the package 101. In the packaged product 100, a plurality of outer bag bodies 102 may be used.

As the packaging bag used for the packaged product 100, in a case where the mass median particle size of the water-absorbent resin powder is 150 μm more, the packaging bag 1 shown in FIG. 1A(a) is preferable, and in a case where the mass median particle size of the water-absorbent resin powder is less than 150 μm, the packaging bag 1A shown in FIG. 2A(a) is preferable. In the example shown in FIG. 4(b), the package 101 using the packaging bag 1 is shown.

The package 101 of the packaged product 100 is substantially prismatic. The incision 3 or 3A of the packaging bag 1 or 1A is provided at corners of the package 101 corresponding to inner regions at a predetermined distance from the outer peripheral edges of the pair of resin sheet pieces 2a and 2b. More specifically, the incision 3 or 3A of the packaging bag 1 or 1A is provided at positions at a distance which is half (½) of a thickness H of the package 101 from outer peripheral edges of the pair of resin sheet pieces 2a and 2b.

In addition, the package 101 in which the water-absorbent resin powder is filled into the packaging bag 1 or 1A can be obtained by performing standing, stirring, vibrating, tapping, and the like during and/or after the filling of the water-absorbent resin powder and then welding the short-side outer peripheral edges 22a of the pair of resin sheet pieces 2a and 2b, which form the charge opening, by heat sealing or the like. In addition, in the outer bag 102 according to the embodiment, an incision may be provided at positions corresponding to the incision 3 or 3A of the packaging bag 1 or 1A.

During transportation or storage, a plurality of packaged products 100 are stacked on the pallet P as shown in FIG. 5. In addition, a structure in which the plurality of packaged products 100 are stacked on the pallet P may be set as one block, and a plurality of blocks may be stacked. In addition, the plurality of packaged products 100 may be disposed on the pallet P without stacking the packaged products 100. In this way, the pallet P on which the packaged products 100 are disposed may be set as one block, and a plurality of blocks may be stacked.

In an example shown in FIG. 5(a), the plurality of packaged products 100 are disposed in one tier, and this set is stacked in two tiers in total. In an example shown in FIG. 5(b), five packaged products 100 are disposed in the first tier. In an example shown in FIG. 5(c), five packaged products 100 are disposed in the second tier. In this way, the packaged products 100 which are stacked on the pallet P in multiple tiers are fixed to the pallet P using a stretch film or a lashing belt which is well-known in the related art.

In the packaged product 100 according to the embodiment, the water-absorbent resin powder is packaged with the packaging bag 1 or 1A. Therefore, load shifting is suppressed when the plurality of packaged products 100 are stacked.

Figure 6:
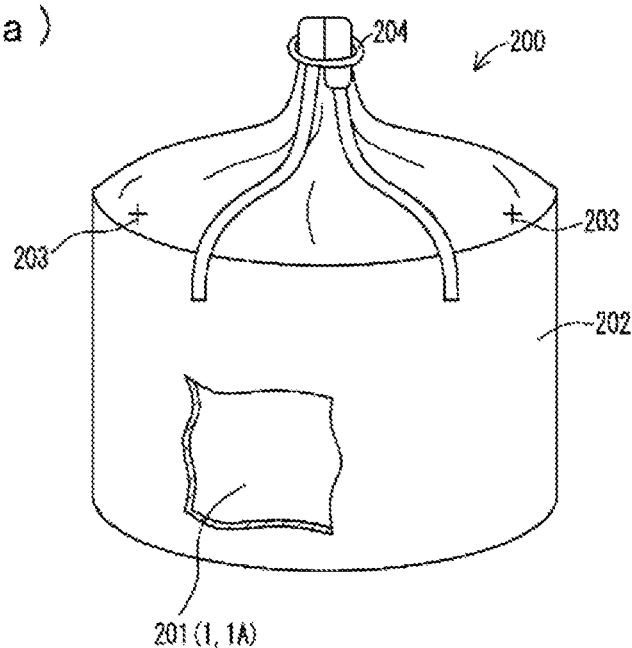
FIG. 6 is a schematic diagram showing a configuration of a packaged product 200 according to an embodiment of the invention.
Figure 6:
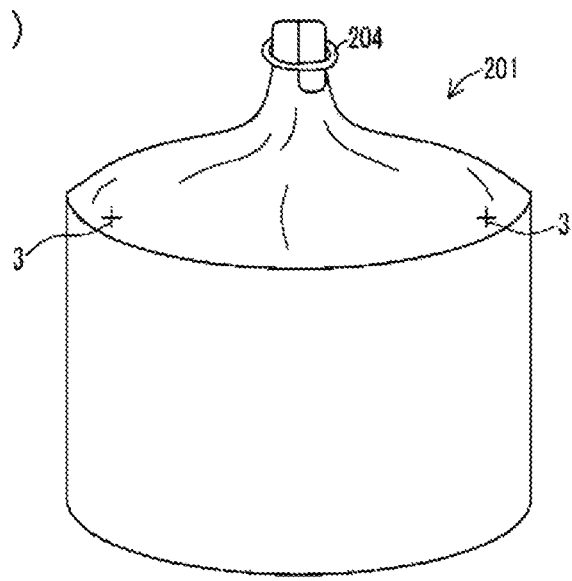
Figure 7:
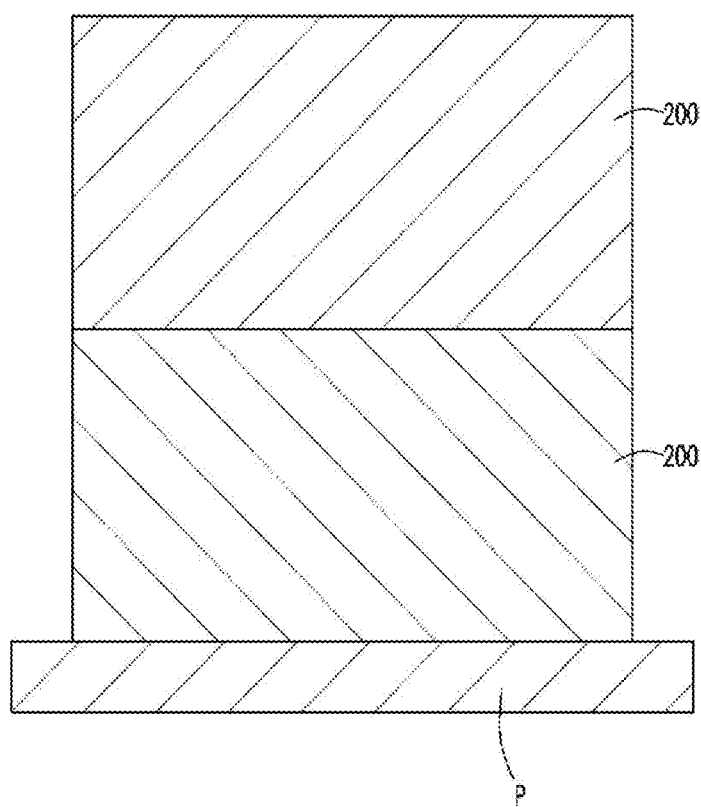
FIG. 7 is a diagram showing states where the packaged products 200 are stacked on the pallet P.

FIG. 6 is a schematic diagram showing a configuration of the packaged product 200 according to an embodiment of the invention. FIG. 7 is a diagram showing states where the packaged product 200 is stacked on the pallet P.

The packaged product 200 according to the embodiment includes: a package 201 composed of the packaging bag 1 or 1A and water-absorbent resin powder which is packaged and sealed with the packaging bag 1 or 1A; and the outer bag 202 which is formed of a flexible container having gas permeability and stores the package 201.

As the packaging bag used for the packaged product 200, in a case where the mass median particle size of the water-absorbent resin powder is 150 μm or more, the packaging bag 1 shown in FIG. 1A(b) is preferable, and in a case where the mass median particle size of the water-absorbent resin powder is less than 150 μm, the packaging bag 1A shown in FIG. 2A(b) is preferable. In the example shown in FIG. 6(b), the package 201 using the packaging bag 1 is shown.

The package 201 of the packaged product 200 is substantially columnar. The incision 3 or 3A of the packaging bag 1 or 1A is provided at peripheral regions of an intersection between an upper surface and a peripheral surface of the package 201 corresponding to inner regions at a predetermined distance from the outer peripheral edges of the pair of resin sheet pieces 2a and 2b.

In addition, the package 201 in which the water-absorbent resin powder is filled into the packaging bag 1 or 1A can be obtained by performing standing, stirring, vibrating, tapping, and the like during and/or after the filling of the water-absorbent resin powder and then binding the short-side outer peripheral edges 22a of the pair of resin sheet pieces 2a and 2b, which form the charge opening, with a stopper 204. The stopper 204 is not particularly limited as long as it can suppress the leakage of the water-absorbent resin powder filled into the packaging bag 1 or 1A by binding the short-side outer peripheral edges 22a of the pair of resin sheet pieces 2a and 2b which form the charge opening. Examples of the stopper 204 include a string, a rubber band, and a clamping band. In the package 201, the short-side outer peripheral edges 22a of the pair of resin sheet pieces 2a and 2b which form the charge opening may be welded by heat sealing or the like.

In addition, in the outer bag 202 according to the embodiment, an incision 203 is provided at positions corresponding to the incision 3 or 3A of the packaging bag 1 or 1A.

During transportation or storage, a plurality of packaged products 200 are stacked on the pallet P as shown in FIG. 7. In addition, a structure in which the plurality of packaged products 200 are stacked on the pallet P may be set as one block, and a plurality of blocks may be stacked. In addition, the plurality of packaged products 200 may be disposed on the pallet P without stacking the packaged products 200. This way, the pallet P on which the packaged products 200 are disposed may be set as one block, and a plurality of blocks may be stacked. In the packaged product 200 according to the embodiment, the water-absorbent resin powder is packaged with the packaging bag 1 or 1A. Therefore, load shifting is suppressed when the plurality of packaged products 200 are stacked.

In addition, during transportation or storage, the plurality of packaged products 200 stacked on the pallet P as shown in FIG. 7 and the plurality of packaged products 100 stacked on the pallet P as shown in FIG. 5(a) may be stacked on each other.

Hereinafter, the invention will be described in more detail based on Examples. However, the invention is not limited to these Examples.

First, evaluation methods will be described below.

<Water Content>

About 2.5 g of water-absorbent resin powder was weighed (X g) in an aluminum cup and was dried using a hot air dryer at 105° C. for 2 hours. The mass (Y g) of the dry water-absorbent resin powder was measured. The water content was calculated from the following expression (the tare mass of the aluminum cup was fixed before and after drying).

Water Content (%)=$(X-Y)/X \times 100$

<Water Retention Capacity>

In a 500 mL beaker, 500 g of 0.9 mass % saline solution (physiological saline solution) was weighed, and 2.0 g of water-absorbent resin powder was dispersed in the physiological saline solution while stirring them at 600 rpm such that particles did not aggregate. By leaving the water-absorbent resin powder to stand for 30 minutes in the stirred state, the water-absorbent resin powder sufficiently swollen. Next, the dispersion was poured into a cotton bag (Cotton Broadcloth No. 60, width 100 mm×length 200 mm), and an upper portion of the cotton bag was bound with a rubber band. The cotton bag was dehydrated for 1 minute using a dehydrator (manufactured by KOKUSAN Co., Ltd., Product No.: H-122) having a centrifugal force set to 167 G. A mass Wa(g) of the cotton bag including the swollen gel after dehydration was measured. The same operations were performed except that the water-absorbent resin powder was not added, and an empty mass Wb(g) of the cotton bag during wetting was measured. The water retention capacity was calculated from the following expression.

Water Retention Capacity of Physiological Saline Solution (g/g)=$[Wa-Wb](g)$/Mass of Water-Absorbent Resin Particles (g)

<Water Absorption Capacity>

Into a 500 mL beaker, 500 g of 0.9 mass % saline solution (physiological saline solution) was put, 2.0 g of the water-absorbent resin powder was added thereto, and the mixture was stirred for 60 minutes. A mass Wa(g) of a JIS standard sieve having an opening of 75 μm was measured in advance. The content of the beaker was filtered through this sieve. By leaving the sieve to stand in a state where it was horizontally tilted at a tilt angle of about 30 degrees for 30 minutes, the remaining water was removed by filtration. A mass Wb(g) of the sieve containing the water-absorbent gel was measured, and the water absorption capacity can be obtained from the following expression.

Water Absorption Capacity (g/g)=$(Wb-Wa)/2.0$

Example 1

First, 20 kg of water-absorbent resin powder having a mass median particle size of 340 μm was filled into a packaging bag (size: 762 mm×495 mm, thickness: 0.07 mm, incision: length=0.5 mm, provided at three positions (having a shape expressed by a circular curve which was formed using a blade having a tapered needle-shaped tip)) shown in FIG. 1A(a) which was formed of a polyethylene resin sheet. Next, a charging opening of the packaging bag was welded and sealed by heat sealing to prepare a package. This package was stored in an outer bag composed of two layers of kraft paper, and an opening of the outer bag was sealed by machine sewing to prepare a packaged product. Five packaged products prepared as described above were disposed in one tier, and this set was stacked on a pallet in ten tiers. Next, a corrugated cardboard sheet for protection was placed in the uppermost tier, and the packaged products were fixed to the pallet using a stretch film.

This pallet in which the set composed of five packaged products was stacked in ten tiers was stacked on a truck in two tiers. This truck was able to be transported without load shifting. In addition, when the packaged product was verified after the transportation, the leakage of the water-absorbent resin powder from the incision provided in the packaging bag was not found. "The set composed of five packaged products" represents that five packaged products were disposed in one tier. "The set composed of five packaged products was stacked in ten tiers" represents that the set in which five packaged products were disposed in one tier was stacked up in ten tiers.

In addition, the packaged products were left to stand in a warehouse at room temperature while avoiding direct sunlight, water, and moisture, and samples were collected therefrom after 0 months, 6 months, 12 months, 24 months, and 36 months. The water content, the water retention capacity, and the water absorption capacity of each of the samples were measured. "The water content" (drying loss) was increased by 0.4%, but there was no effect on the performance. In addition, there was no effect on "the water retention capacity" and "the water absorption capacity" with respect to the physiological saline solution as the main performance of the water-absorbent resin powder. The results are shown in Table 1.

TABLE 1

| Elapsed Time (Month) | Water Content (%) | Water Retention Capacity (g/g) | Water Absorption Capacity (g/g) |
|---|---|---|---|
| 0 | 7.4 | 40 | 60 |
| 6 | 7.7 | 40 | 60 |
| 12 | 7.6 | 39 | 61 |
| 24 | 7.8 | 39 | 62 |
| 36 | 7.8 | 39 | 59 |

Example 2

A packaged product was prepared using the same method as in Example 1, except that 20 kg of water-absorbent resin powder having a mass median particle size of 185 μm was used instead of 20 kg of the water-absorbent resin powder having a mass median particle size of 340 μm. The size of the packaging bag was 876 mm×545 mm. This packaged product was able to be transported without load shifting. In addition, when the packaged product was verified after the transportation, the leakage of the water-absorbent resin powder from the incision provided in the packaging bag was not found.

Example 3

A packaged product was prepared using the same method as in Example 1, except that: 20 kg of water-absorbent resin powder having a mass median particle size of 78 μm was used instead of 20 kg of the water-absorbent resin powder having a mass median particle size of 340 μm; and a packaging bag (size: 740 mm×500 mm) in which 1500 incisions having a length of 0.1 mm were provided was used.

This packaged product was able to be transported without load shifting. In addition, when the packaged product was verified after the transportation, the leakage of the water-absorbent resin powder from the incision provided in the packaging bag was not found.

Example 4

A packaged product was prepared using the same method as in Example 3, except that 20 kg of water-absorbent resin powder having a mass median particle size of 24 μm was used instead of 20 kg of the water-absorbent resin powder having a mass median particle size of 78 μm. The size of the packaging bag was 740 mm×500 mm. This packaged product was able to be transported without load shifting. In addition, when the packaged product was verified after the transportation, the leakage of the water-absorbent resin powder from the incision provided in the packaging bag was not found.

Example 5

A packaged product was prepared using the same method as in Example 3, except that a packaging bag (size: 740 mm×500 mm) in which 310 incisions having a length of 0.1 mm were provided was used. This packaged product was able to be transported without load shifting. In addition, when the packaged product was verified after the transportation, the leakage of the water-absorbent resin powder from the incision provided in the packaging bag was not found.

Example 6

A packaged product was prepared using the same method as in Example 4, except that a packaging bag (size: 740 mm×500 mm) in which 310 incisions having a length of 0.1 mm were provided was used. This packaged product was able to be transported without load shifting. In addition, when the packaged product was verified after the transportation, the leakage of the water-absorbent resin powder from the incision provided in the packaging bag was not found.

Comparative Example 1

A packaged product was prepared using the same method as in Example 1, except that a packaging bag in which no incisions were provided was used. During the transportation of the packaged product, load shifting occurred.

Comparative Example 2

A packaged product was prepared using the same method as in Example 2, except that a packaging bag in which no incisions were provided was used. During the transportation of the packaged product, load shifting occurred.

Comparative Example 3

A packaged product was prepared using the same method as in Example 3, except that a packaging bag (size: 762 mm×495 mm) in which 3 incisions having a length of 0.5 mm were provided was used. This packaged product was able to be transported without load shifting. However, when the packaged product was verified after the transportation, the leakage of the water-absorbent resin powder from the incision provided in the packaging bag was found.

Comparative Example 4

A packaged product was prepared using the same method as in Example 3, except that a packaging bag in which no incisions were provided was used. The size of the packaging bag was 762 mm×495 mm. During the transportation of the packaged product, load shifting occurred.

Comparative Example 5

A packaged product was prepared using the same method as in Example 4, except that a packaging bag (size: 762 mm×495 mm) in which 3 incisions having a length of 0.5 mm were provided was used. This packaged product was able to be transported without load shifting. However, when the packaged product was verified after the transportation, the leakage of the water-absorbent resin powder from the incision provided in the packaging bag was found.

Comparative Example 6

A packaged product was prepared using the same method as in Example 4, except that a packaging bag in which no incisions were provided was used. The size of the packaging bag was 762 mm×495 mm. During the transportation of the packaged product, load shifting occurred.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1, 1A: Packaging bag
2: Resin sheet
2a, 2b: Resin sheet piece
3, 3A: Incision
21a, 21b: Long-side outer peripheral edge
22a, 22b: Short-side outer peripheral edge
100: Packaged product
101: Package
102: Outer bag
200: Packaged product
201: Package
202: Outer bag
203: Incision
204: Stopper
P: Pallet

The invention claimed is:
1. A packaged product, comprising:
a package composed of a packaging bag for packaging water-absorbent resin powder having a mass median particle size of 150 μm or more, the packaging bag including:
  a resin sheet forming an outermost surface of the packaging bag and forming a water-absorbent resin powder holding area, the resin sheet having gas barrier properties which is formed in a bag shape having an opening,
  an incision having a length of 0.5 mm or less being provided in the resin sheet so as to penetrate through the resin sheet in a thickness direction thereof that directly communicate with the water-absorbent resin powder holding area, wherein air present in the packaging bag together with the water-absorbent resin powder can be released to the outside of the packaging bag through the incision, wherein the incision is provided at a position distant from an outer peripheral edge in a plan view of the packaging bag, and water-absorbent resin powder packaged with the packaging bag; and an outer bag formed of kraft paper with gas permeability and a plurality of incisions through the outer bag and storing the package.

2. The packaged product according to claim 1, wherein the number of incisions per unit are of the outer bag is 0.000001 to 0.03 pieces/mm$^2$.

3. A packaged product, comprising:

a package composed of a packaging bag for packaging water-absorbent resin powder having a mass median particle size of 150 μm or more, the packaging bag including:

a resin sheet forming an outermost surface of the packaging bag and forming a water-absorbent resin powder holding area, the resin sheet having gas barrier properties which is formed in a bag shape having an opening, an incision having a length of 0.5 mm or less being provided in the resin sheet so as to penetrate through the resin sheet in a thickness direction thereof that directly communicate with the water-absorbent resin powder holding area, wherein air present in the packaging bag together with the water-absorbent resin powder can be released to the outside of the packaging bag through the incision, wherein the incision is provided at a position distant from an outer peripheral edge in a plan view of the packaging bag, and water-absorbent resin powder packaged with the packaging bag; and an outer bag formed of kraft paper with gas permeability and a plurality of incisions through the outer bag and storing the package.

4. A package bag for packaging water-absorbent resin powder having a mass median particle size of 150 μm or more, the packaging bag including:

a resin sheet forming an outermost surface of the packaging bag and forming a water-absorbent resin powder holding area, the resin sheet having gas barrier properties which is formed in a bag shape having an opening, and an incision having a length of 0.5 mm or less being provided in the resin sheet so as to penetrate through the resin sheet in a thickness direction thereof that directly communicate with the water-absorbent resin powder holding area, wherein air present in the packaging bag together with the water-absorbent resin powder can be released to the outside of the packaging bag through the incision, wherein the number of incisions per unit area of the resin sheet is 0.0000001 to 0.000005 pieces/mm$^2$.

* * * * *